(12) United States Patent
Hay et al.

(10) Patent No.: US 9,990,420 B2
(45) Date of Patent: Jun. 5, 2018

(54) METHOD OF SEARCHING AND GENERATING A RELEVANT SEARCH STRING

(75) Inventors: Robert Hay, Turner Australian Capital Territory (AU); Anthony Steven William Drabsch, Turner Australian Capital Territory (AU)

(73) Assignee: ENTIT SOFTWARE LLC, Sunnyvale, CA (US)

(*) Notice: Subject to any disclaimer, the term of this patent is extended or adjusted under 35 U.S.C. 154(b) by 169 days.

(21) Appl. No.: 14/342,734

(22) PCT Filed: Nov. 2, 2011

(86) PCT No.: PCT/US2011/058937
§ 371 (c)(1),
(2), (4) Date: Mar. 4, 2014

(87) PCT Pub. No.: WO2013/066323
PCT Pub. Date: May 10, 2013

(65) Prior Publication Data
US 2014/0244685 A1 Aug. 28, 2014

(51) Int. Cl.
*G06F 17/30* (2006.01)

(52) U.S. Cl.
CPC .. *G06F 17/30678* (2013.01); *G06F 17/30967* (2013.01)

(58) Field of Classification Search
CPC ......... G06F 17/30678; G06F 17/30967; G06F 17/30964; G06F 17/30991; G06F 17/30637; G06F 17/30696
USPC ......................................................... 707/769
See application file for complete search history.

(56) References Cited

U.S. PATENT DOCUMENTS

| | | | |
|---|---|---|---|
| 5,982,370 A * | 11/1999 | Kamper | G06F 3/0481 707/999.003 |
| 6,317,739 B1 | 11/2001 | Hirata et al. | |
| 7,200,804 B1 * | 4/2007 | Khavari | G06F 17/30864 715/230 |
| 7,383,513 B2 | 6/2008 | Goldberg et al. | |
| 7,640,550 B1 * | 12/2009 | Goel | H04L 12/1818 707/999.003 |
| 2002/0032675 A1 | 3/2002 | Williamowski et al. | |
| 2002/0087620 A1 * | 7/2002 | Rouse | H04M 3/493 709/203 |
| 2003/0107842 A1 | 6/2003 | Sasaki et al. | |
| 2004/0133564 A1 * | 7/2004 | Gross | G06F 17/30398 707/999.003 |
| 2006/0101285 A1 * | 5/2006 | Chen | G06F 21/602 713/193 |
| 2006/0173834 A1 | 8/2006 | Brill et al. | |
| 2008/0133487 A1 * | 6/2008 | Gross | G06F 17/30864 707/999.003 |

(Continued)

OTHER PUBLICATIONS

InQuira Overview, InQuira, Inc., pp. 1-23. San Bruno, California. Download Date Nov. 2, 2011. <http://www.inquira.com/pdf/CompOver0607.pdf>.

(Continued)

*Primary Examiner* — Vincent F Boccio (57) ABSTRACT

A computer implemented method of searching for records. The method comprises generating a relevant search string based on extracted text and related contextual information.

20 Claims, 9 Drawing Sheets

(56) References Cited

U.S. PATENT DOCUMENTS

| | | | |
|---|---|---|---|
| 2010/0070486 A1* | 3/2010 | Punaganti Venkata | ......................... G06F 17/30893 707/722 |
| 2010/0161582 A1 | 6/2010 | Spohr et al. | |
| 2010/0306185 A1* | 12/2010 | Smith | .................. G06Q 10/107 707/748 |
| 2011/0015996 A1 | 1/2011 | Kassoway et al. | |
| 2011/0082878 A1 | 4/2011 | Nozaki | |

OTHER PUBLICATIONS

International Search Report and Written Opinion dated Jul. 30, 2012 issued on PCT Patent Application No. PCT/US2011/058937 dated Nov. 2, 2011, Korean Intellectual Property Office.
European Patent Office, Extended European Search Report for EP App. No. 11874975.3 dated Jun. 8, 2015 (6 pages).

* cited by examiner

| Contextual Data | Search Type |
|---|---|
| Outlook From: | By email address |
| Outlook To: | By email address |
| Outlook Cc: | No search |
| Outlook Title: | By Title Word |
| Outlook Body: | By any word |
| Outlook Sent: | By date |
| Winword | By notes |

METHOD OF SEARCHING AND GENERATING A RELEVANT SEARCH STRING

CLAIM FOR PRIORITY

The present application is a national stage filing under 35 U.S.C. 371 of PCT application No. PCT/US2011/058937, having an international filing date of Nov. 2, 2011, the disclosure of which is hereby incorporated by reference in its entirety.

BACKGROUND

In recent years the amount of data produced and stored by enterprises has increased exponentially. Searching the data to find relevant records poses a significant challenge. Various techniques exists which typically involve entering a search string to search for relevant data. However, remembering the search terms and constructing the search string can be difficult for inexperienced users.

For example, if a user wants to search for all records sent by User A on 3 Dec. 2010, they might have to enter a structured search string such as "AuthorID=User A AND Recdate=03Dec10". If they wish to search for all records (e.g. emails) received by User B on 3 Dec. 2010, they might have to enter a structured search string such as "RecipID=User B AND Receiveddate=03Dec10". Not only is typing these search terms cumbersome, if any search term is spelt incorrectly or date entered in a different format (e.g. 03122010) then no matches or an error may be returned. Further, the user needs to remember the exact name of all of the search terms.

DETAILED DESCRIPTION

The present disclosure proposes a computer implemented method of searching for records. In one example, by detecting the location of a mouse pointer or otherwise allowing a user to select a screen element, the text contents of the screen element may be automatically extracted and processed to generate a relevant search string. For example, the screen element may be mapped to one or more pre-defined search types and text from the screen element may be automatically or semi-automatically entered into the search type to produce a relevant search string. Further, the text may be filtered so that only relevant portions are entered to the search strings and/or processed into the correct format before being entered into the search string.

Figure 1:
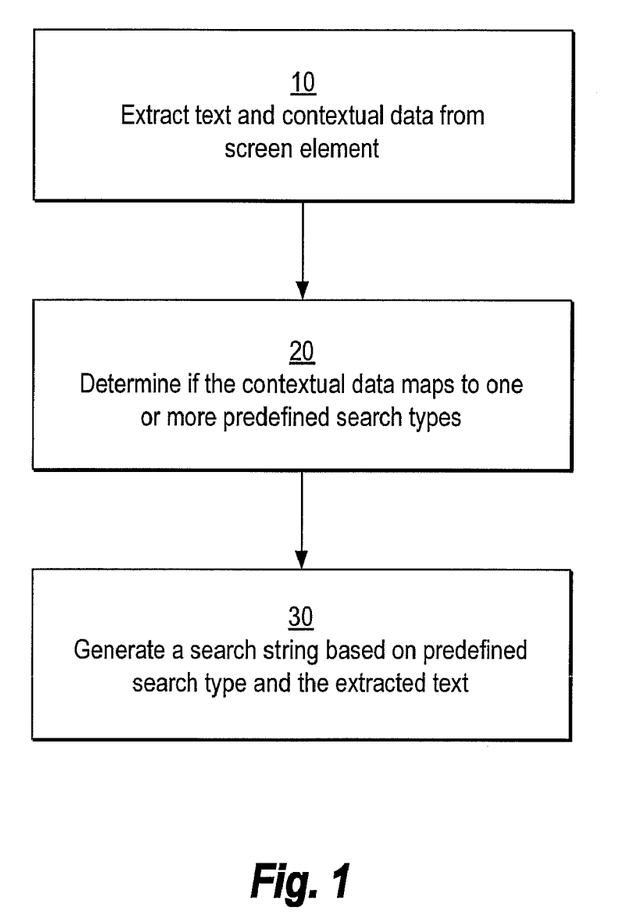
FIG. 1 is a flow diagram of a method of searching for records comprising generating a search string.

FIG. 1 is a high level flow diagram showing one example of the computer implemented method. By 'computer implemented' it is meant that the processes are carried out by a computer. The term 'computer' is to be interpreted generally as any device with a display, a memory for storing machine readable instructions and a processor for executing those instructions. For instance the process may be carried out by a desktop or laptop computer, work station, mobile device, smart phone, tablet computer or a printing device with a display screen etc.

Any or all the processes described below may be performed automatically by the computer without further user input. In one example the user positions a pointer over the desired screen element and starts the process (e.g. by clicking a mouse button, selecting an on-screen option or similar) and the subsequent extraction and search is carried out automatically. In other examples the method may request further user input, e.g. to refine the search type or to confirm pre-selected search options.

At 10 text is extracted ('scraped') from a screen element together with contextual data. A screen element is an element displayed on a visual display unit, e.g. an element in a graphical user interface environment, such as a window, a portion of a window, an application, an icon, or portion thereof etc. Contextual data is data indicating the context of the text and may for example be operating system data indicating the type of screen element from which the text has been extracted.

Figure 2:
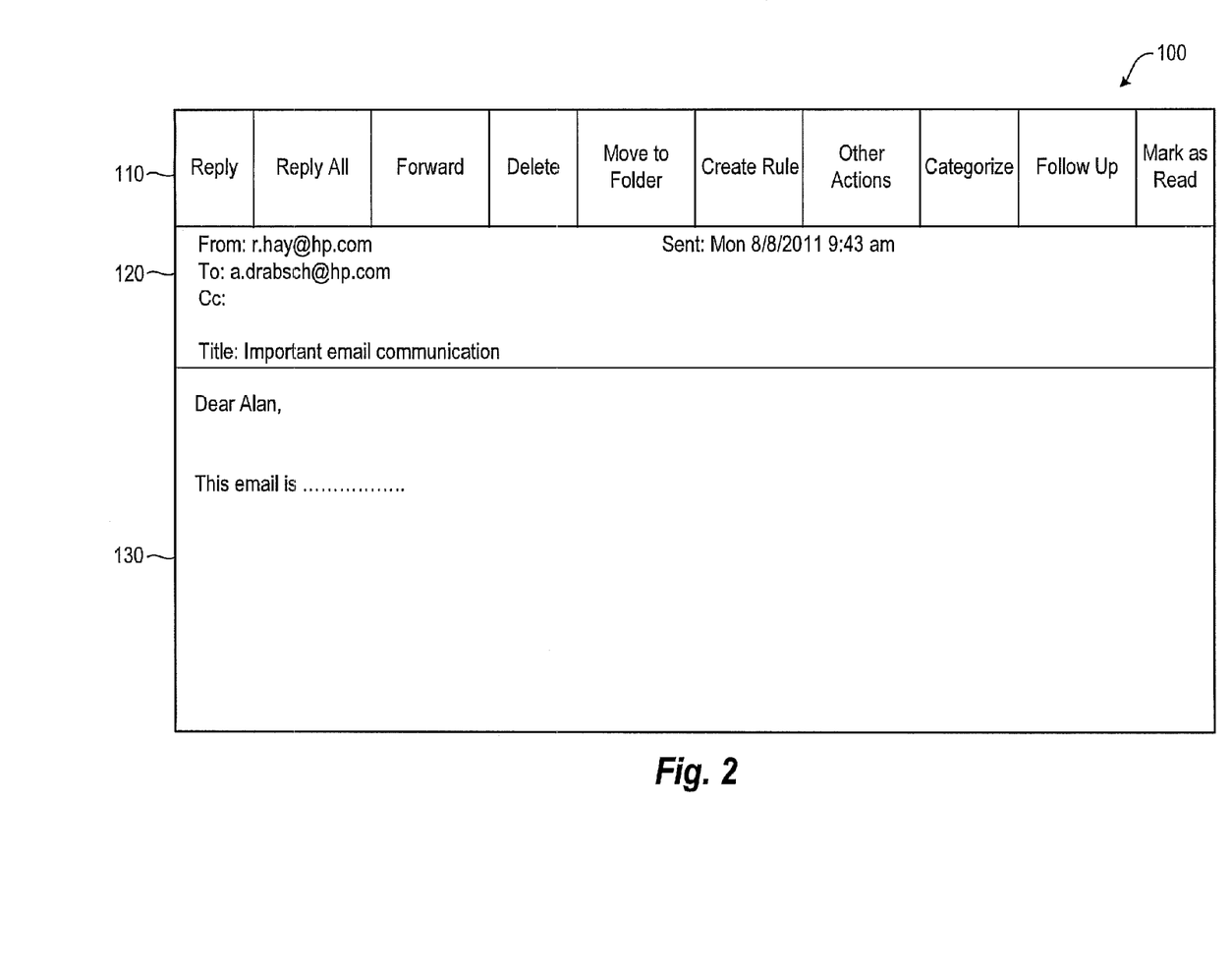
FIG. 2 shows an email message as an example of several screen elements.

FIG. 2 shows an email message window 100, as one example of a screen element. The email message window is itself a screen element, but also comprises further smaller screen elements. A first screen element is the tool bar 110, a second screen element is the header box 120, a third screen element is the email body 130. It will be noted that the header box 120 typically contains various items of text such as the sender, recipient, email title and sent date. Depending upon the operating system and email application in question, in some cases it may be possible to obtain contextual data indicating the part of the screen element from which the text has been extracted, e.g. the sender, recipient, title and sent date may be classed as separate items within the screen element. In other cases the email window, or the header box may be the lowest level for contextual data without a further level of granularity. In any case text may be extracted from the screen elements together with contextual data.

Referring back to FIG. 1, at block 20 a check is made to see if the contextual data has been mapped to one or more predefined search types. For example, a relationship between particular contextual data and particular predefined search types may be defined in the computer program code, or by referring to a mapping file. Defining the relationship in the computer code has the advantage that it relieves the system administrator from the burden of defining the relationships and provides an 'off the shelf' solution; while use of a mapping file is more cumbersome to set up but avails the customer with greater flexibility to support different applications and define the search terms they want. The term 'mapped' or 'mapping' is to be interpreted broadly to cover both these possibilities and a combination thereof.

Mapping contextual data to predefined search types makes it possible to perform a relevant search with the extracted text. So for instance, where the contextual data indicates that the text has been extracted from the header of an email then the extracted text may be used to conduct 'by email address' and/or by 'date' searches.

At block 30 the search string is constructed by entering extracted text into one of the predefined search types identified in block 20 to form a search string. For example if the extracted text is "Robert.hay@hp.com" and the contextual data indicates an email header and is mapped to "search by email address" then the predefined search type may be appended to the extracted text to form a search string to search for records having that email address, e.g. Emailaddress="Robert.hay@hp.com". The program code may automatically generate a search string having the correct syntax and terms, so the user does not have to remember them.

If there are several email addresses in the extracted text then several search strings may be combined with Boolean logic to form a more complicated search. E.g. if the extracted text contains the email addresses "Robert.hay@hp.com" and "Anthony.Drabsch@hp.com" then they could be combined with an OR operator to form the string Emailaddress="Robert. hay@hp.com" OR Emailaddress="Anthony.Drabsch@hp.com". Likewise, where there is more than one predefined search type, the predefined search types may be combined with Boolean logic to form a more complicated search string. E.g. if the extracted text comprises the email address "Robert.hay@hp.com" and the date 20 Sep. 2011, then the resulting search may be for all records with the email address "Robert.hay@hp.com" dated 20 Sep. 2011, e.g. the search string could be: Emailaddress="Robert.hay@hp.com" AND RecDate="20 Sep. 2011". The way in which the search strings are logically combined may be specified in a mapping file, e.g. by a system administrator.

Figure 3:
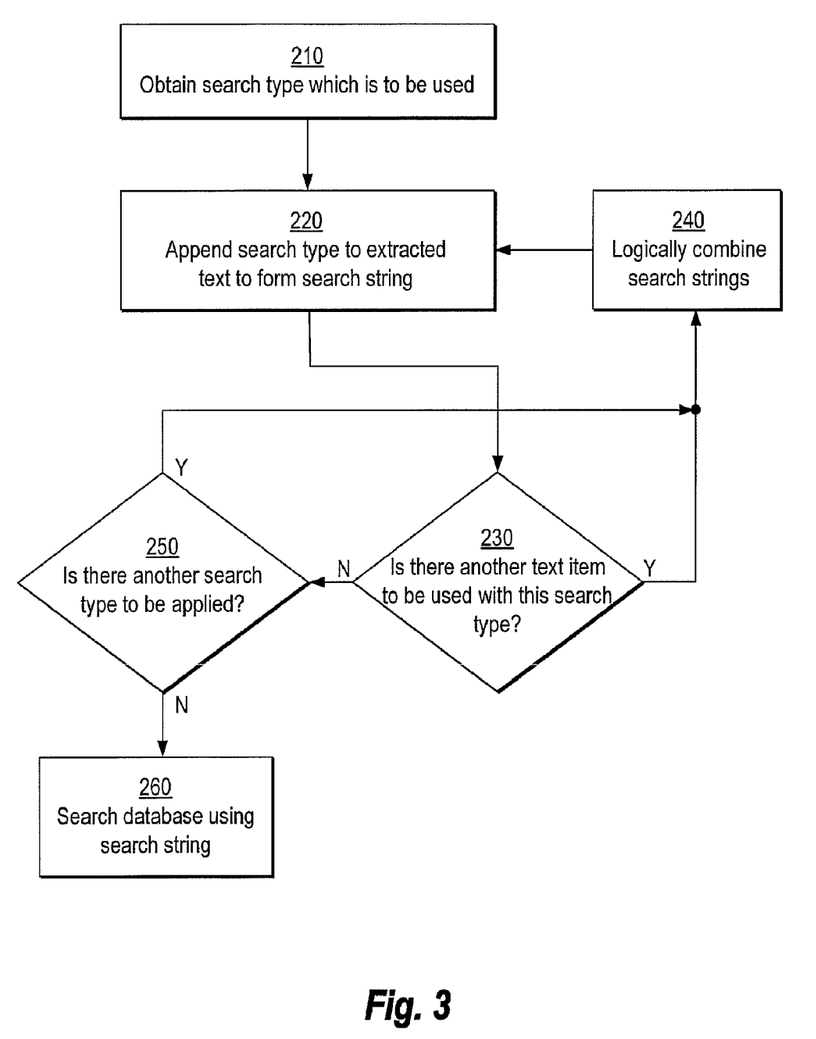
FIG. 3 is a flow diagram showing a method of generating a search string.

FIG. 3 is a flow diagram showing a method of building search strings from extracted text and predefined search types. At 210 the search type which is to be used is obtained (e.g. the predefined search type based on the contextual data). At 220 the search type is appended to the extracted text (or a portion thereof) to form the search string. At 230 it is determined if there is a further extracted text string to be used in the search (e.g. another email address), if so then the method proceeds to 240 and the search string is logically combined with a new search string generated at 220. If there are no further text strings to be used with that search type then the method proceeds to 250 and it is determined if there are any further search types to be applied to the extracted text. If so then the existing search strings are logically combined with new search strings generated for the new search type at 240 and 220. The way in which search strings are logically combined may be determined in predefined settings (e.g. set by the system administrator) or by user input.

Once the search string has been generated it can be used to search the database directly or passed to a search service for searching a database at 260. In one example the search is conducted by forming a search query which comprises the search string and may contain other data, and applying this search query to the database.

For further understanding of the present disclosure examples of specific implementation of the blocks illustrated in FIG. 1 will not be described in more detail.

Figure 4:
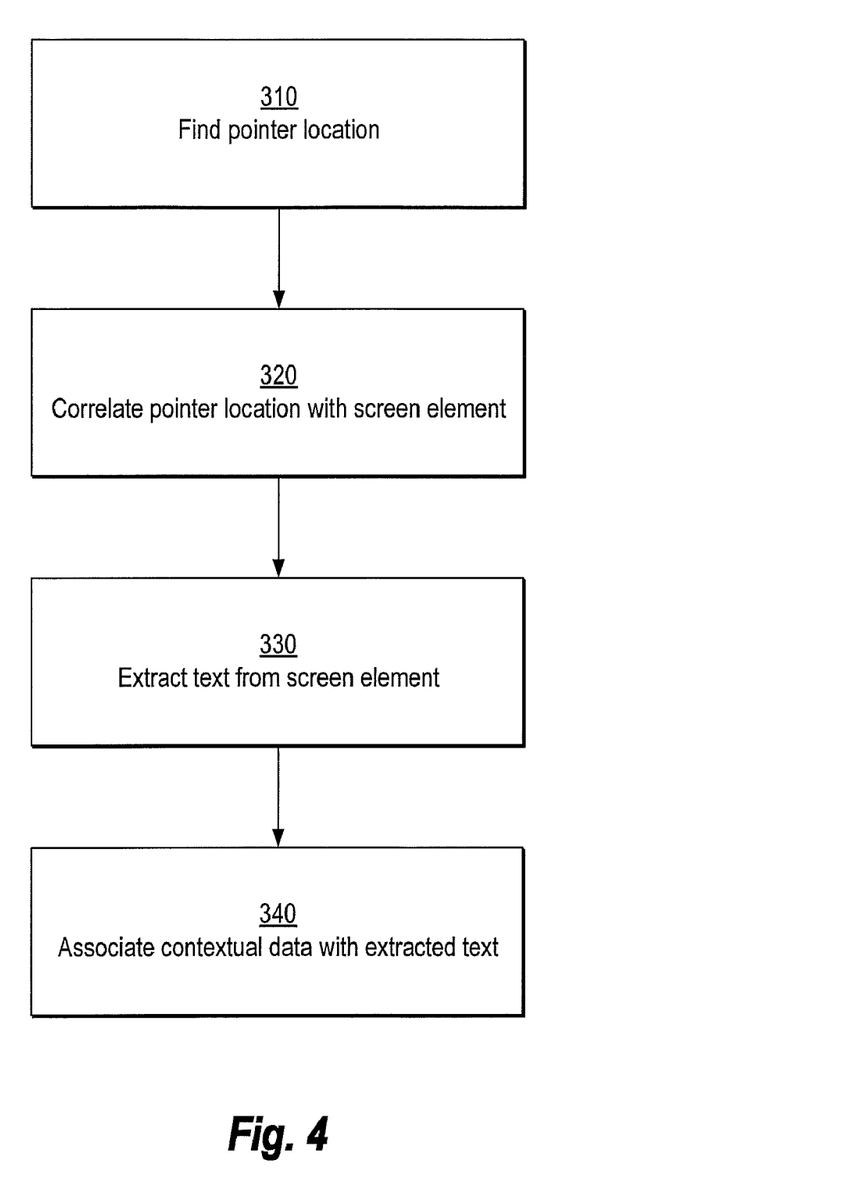
FIG. 4 is a flow diagram of a method of extracting text from a screen element.

FIG. 4 shows one example of how text may be extracted from a screen element (block 10 of FIG. 1) in more detail. At 310 a pointer location is found ('pointer location' means the on-screen position of a user pointer such as a mouse pointer, finger tip on a touch screen device, or text input cursor etc). At 320 the pointer location is correlated with a screen element. For instance, this may be done by querying the GUI OS software; Windows for example has a 'User Automation Element' which lists information about each screen element including its location on the screen. At 330 text is extracted from that screen element. At 340 contextual data is associated with the extracted text. For instance the contextual data may be taken from the User Automation Element—e.g. if the pointer is over the email header box 120 in FIG. 2 then the User Automation Element may comprise the following information: a process ID (the software application, in this case Outlook); a class ID (the part of the screen element which has been selected, in this case the header box) and one or more Item IDs which specify the particular part of the screen element, in this case the "From:", "To:", "Cc:', "Title:" and "Sent:".

Figure 5:
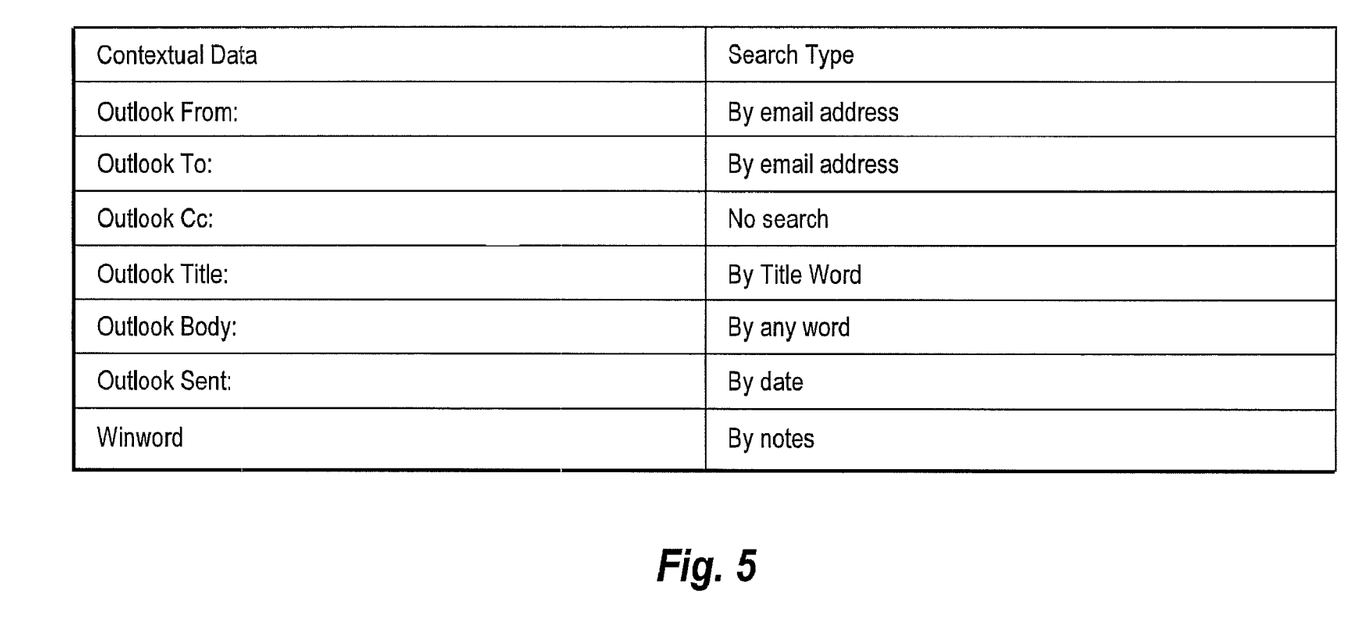
FIG. 5 is a table showing an example of mappings of contextual data to search types.

As mentioned above, at block 20 of FIG. 1 it is determined if the contextual data is mapped to one or more predefined searches. FIG. 5 is a table showing example mappings of contextual data to search types—the left column 160 lists the contextual data (in this case the screen element item) and the right column 170 lists the corresponding search type.

Thus, in the mapping shown in FIG. 5, text extracted from the "Outlook from:" or "Outlook to:" fields is mapped to a "By email address" search. Meanwhile "Outlook Cc:" is mapped to no search; this may be advantageous as a large number of people are often cc'd to an email and searching all of them might be time consuming without delivering useful results.

Further, "Outlook title:" is mapped to a "By title word" search which searches for records or documents containing the extracted text in their title. In the case of the Outlook Body a "By any word" search may match any record or document which has the extracted text in one of its text or notes fields (e.g. email body). In order to limit the number of matches the whole or a substantial part of the extracted text may need to be present in order to find a match; e.g. if the title is "C++ seminar" then only records having the text string "C++ seminar" may match (rather than any records containing either "C++" or "seminar").

Further, in the above example, "Outlook sent:" is mapped to a "By date search" which searches for documents created on the same date.

Winword is mapped to a "By notes" search, which searches notes fields (or an associated file). A notes field is any text field other than the title. In this example the "By notes" search matches any records or documents with text strings in the notes field which match the extracted text. E.g. the text may be extracted from the Winword document title and the search will find documents or records which have that text in their notes field.

One way of defining the mappings is to use a mapping file, for instance in XML. An example of part of a mapping file in XML is given below.

```
<PROCESS id="OUTLOOK">
    <CLASS id="RichEdit20WPT">
        <ITEM id="From:">
            <SEARCHTYPE>By Email Address</SEARCHTYPE>
        </ITEM>
    </CLASS>
</PROCESS>
```

In the Windows Automation Element, the class id "RichEdit20WPT" indicates the email header box. Thus, the above example specifies that if the contextual data indicates that the text is extracted from the "From:" section of the email header box of a window belonging to the Outlook email application, then the predefined search type is "By email address". While in the above example, the search types are described in plain English the XML file could give the search types in the form of the actual search term syntax used by the database or search service. E.g. 'Recdate=' rather than 'By date search'. Alternatively the XML file may give the search type in plain English and a dictionary file may be used to translate the plain English to the correct search term syntax. In still another implementation, the mapping may be defined in the computer code itself without reference to a mapping file. In addition to the search type mapping, the computer code or mapping file may define how different search strings are to be logically combined.

In the above example the contextual data has a fine level of granularity and indicates the particular part of the screen element from which a string of text has been extracted (for instance whether the text string has been extracted from the "From:", "To:"or "Title:" etc fields of the email header). However, in some cases that level of granularity may not be available and the contextual data may simply indicate that text has been extracted from a particular screen element (e.g. email header) without specifying which part. In that case (and other cases) the contextual data may be mapped to several different search types. For example, if the contextual data indicates that the text has been extracted from the email header (without specifying which part of the header), then the extracted text may be appended to a by email address' search and a 'by date' search with OR logic to return any documents matching either search.

FIG. 1 shows the extracted text being appended directly to the search type to form a search string at block 30. In some cases this will be possible, for example if the extracted text is already in the correct format and does not comprise any extra elements other than that which is to be used in the search. However, in other cases it will be helpful to process the extracted text before it is appended to the search type.

Therefore an intermediate process may be used to determine the text type and/or identify relevant text strings in the extracted text. For example, if the extracted text is a plurality of email addresses separated by semi-colons, then a text determination process may be used to remove the semi-colons and identify the individual email addresses as separate text stings for entry into the 'by email address' search. Likewise, if the extracted text is not already split up by item, but contains several different items from the screen element, then the text determination process may be used to identify particular types of search string. For example if the extracted text reads "To: Robert.hay@hp.com From: Anthony.Drabsch@hp.com Sent: 26 Jul. 2011 Title: C++ seminar " or even "Anthony.Drabsch@hp.com Robert.hay@hp.com 26 Jul. 2011 C++ seminar", then a text determination process may be used to identify which text strings are email addresses, which are dates and which are titles or free text, such that they may be entered into the relevant predefined search types.

The same principle could be applied to any large body of text (e.g. an email body or word document), wherein the text determination process finds dates, people names, email addresses, telephone numbers etc contained in the document, which can then be entered into the appropriate search type.

Figure 6:
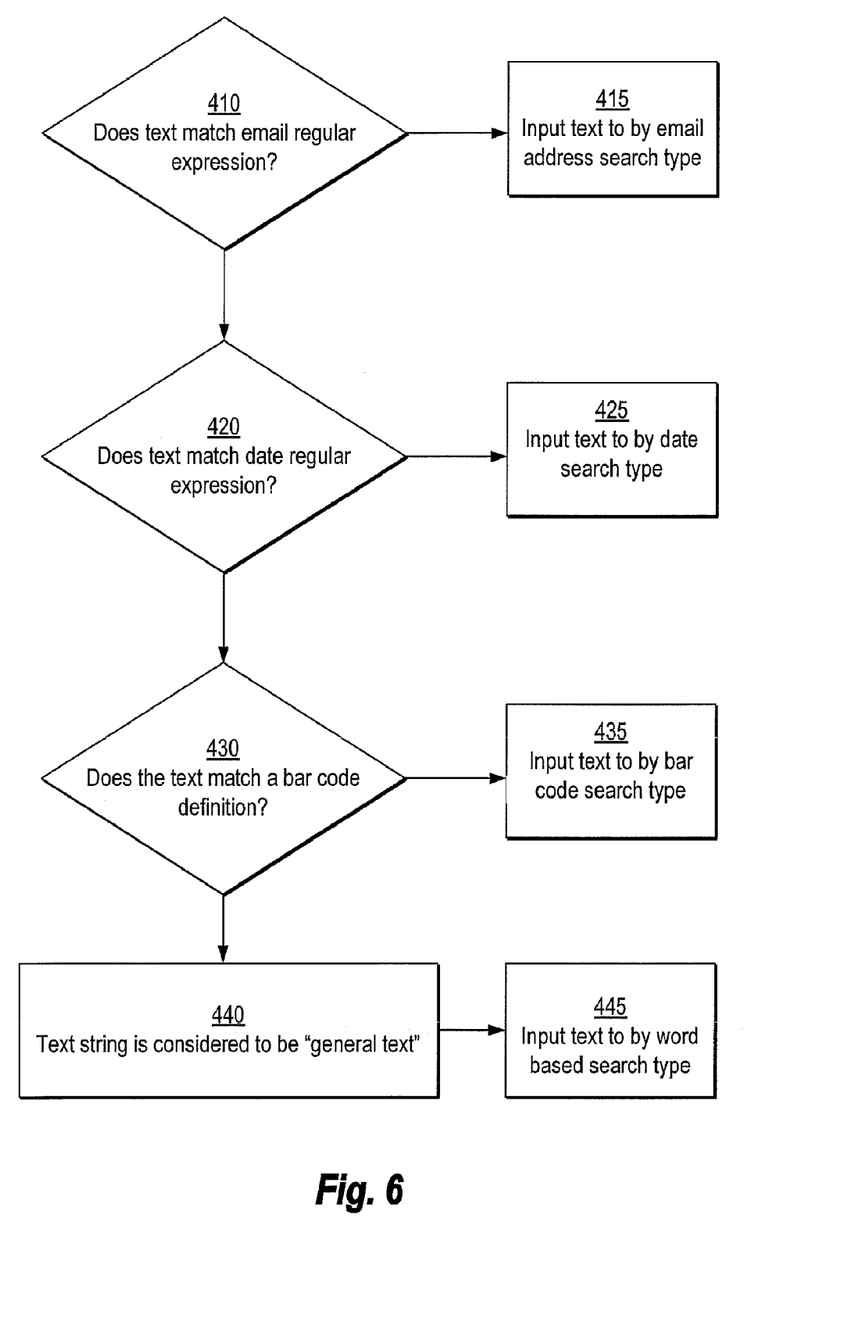
FIG. 6 is a flow diagram showing a method of determining text data type.

One way of determining the text is to use a 'waterfall model', an example of which is illustrated in FIG. 6. A 'waterfall model' applies a series of analyses to a text string to determine its data type. In this example 'regular expressions' (often known as 'regex') are used to determine the text data type, but other types of text search or categorization could be used. A 'regular expression' specifies particular text string characteristics and then a text file or text string can be compared to the regular expression to see if it matches and any matching results output. Thus for example, an email regular expression may identify email addresses on the basis of an '@' symbol followed by a domain name.

Referring to FIG. 6, at 410 it is determined if any of the extracted text matches an email regular expression. If so then the matching text is determined to be an email address and input to the by email address type search method at 415. If not then at 420 it is determined if any of the extracted text matches a date regular expression. If so then the matching text is determined to be a date and input to the by date type search method at 425. At 430 it is determined if the extracted text matches a bar code standard, if so then the extracted text may be input into a bar code type search method 435. While only three examples are given here (email address, date and bar code), other regular expressions or analyses could be used as appropriate to determine other data types. Any text which is not determined to be one of the above types (e.g. a title or email body) may categorized as 'free text' at 440 and may be entered into a text based search method at 445, e.g. a 'by any word' search or a 'by title word' search.

Further, while not illustrated in FIG. 6, certain text types may need to be converted to a standard format before being entered into a predefined search type. For example, a date may need to be converted to a particular format used by the database in question. E.g. 26 Jul. 2011 may be converted to 26 Jul. 2011. Similarly if some of the mapped search types obtained in 20 are by 'person' rather than by email address (e.g. the database may have a unique person ID which needs to be searched rather than an email address), then a conversion from email address to person ID may be performed.

The above text determination or identifying process may be carried out before, in parallel with or after the contextual data mapping check of block 20.

Once text strings have been associated with text types, then at block 30 of FIG. 1 the text strings are entered into the predefined search types (mapped in block 20) that are related to that text type. For example a person ID or email address will be entered into a 'by email' search or possibly a 'by author' or 'by recipient' type search (if these search types are mapped to the contextual data). Meanwhile a date may be entered into any date type searches in the predefined search list and free text may be entered to a 'by title word' search or a 'by any word' search (if a 'by title word' or 'by any word' search is mapped to the contextual data).

Figure 7:
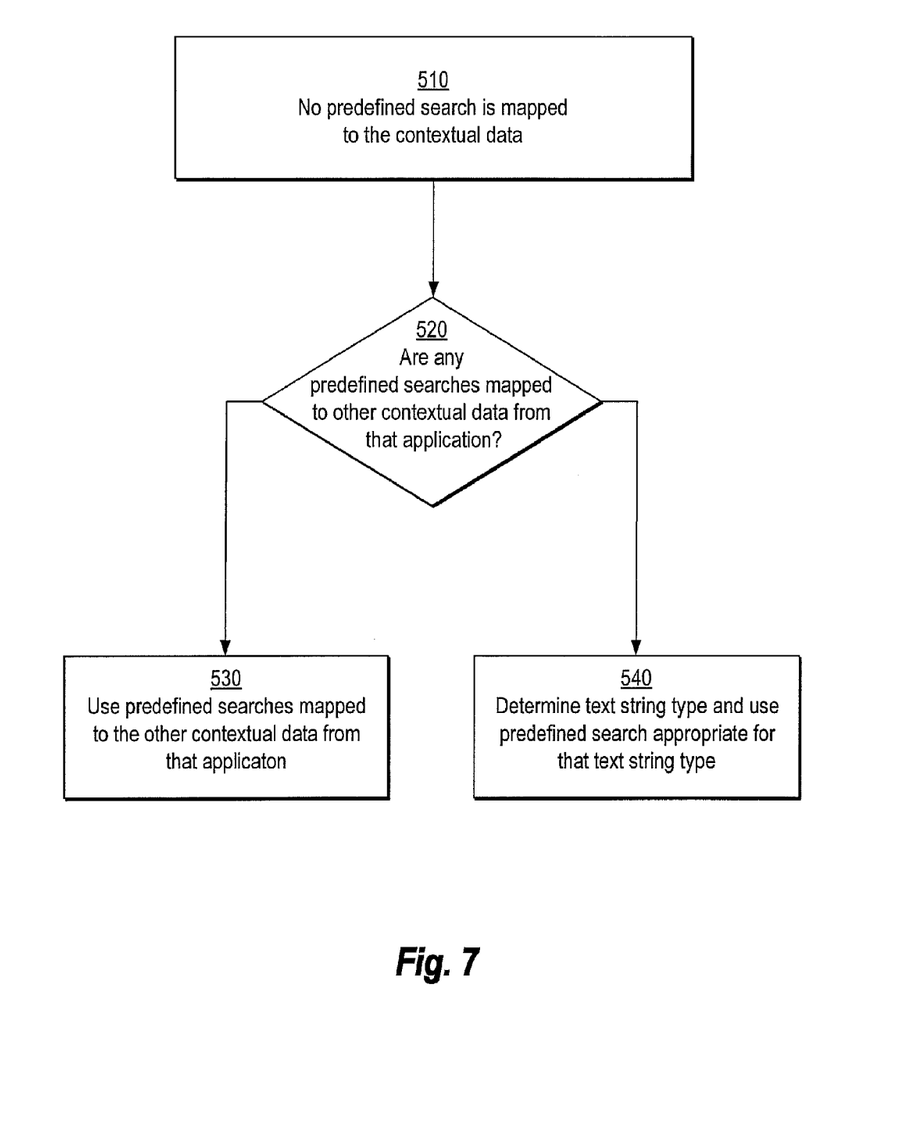
FIG. 7 is a flow diagram of a method of generating a search string when there is no predefined search mapped to the contextual data.

FIG. 7 shows a method of searching if the contextual data is not mapped to any predefined search types. This may happen, for instance, if the text has been extracted from a software application for which no mapping to a predefined search type has been defined yet, or if the text is extracted from a screen element of a known application for which no mapping has been defined yet. At 510 it is determined that no mapping of the contextual data to a predefined search type exists. At 520 it is determined if other contextual data has been mapped for that application. For instance, in the User Automation Element if the item or class in question (contextual data) has not been mapped to a predefined search type, but another class or item (other contextual data) of the same process (software application) has been mapped then at 530 that mapping is used for the current item or class. This may be automatic, or alternatively the option to use the other contextual data mapping may be presented to the user to confirm or modify. The new mapping can then be saved for future use next time the same contextual data appears. On the other-hand if no mapping for the same application exists, then the method proceeds to 540 where the text type of the extracted text is determined and a predefined search type appropriate for that text type is selected and used either automatically or with user confirmation. Again, the selected predefined search type may be saved for future use with that contextual data.

Figure 8:
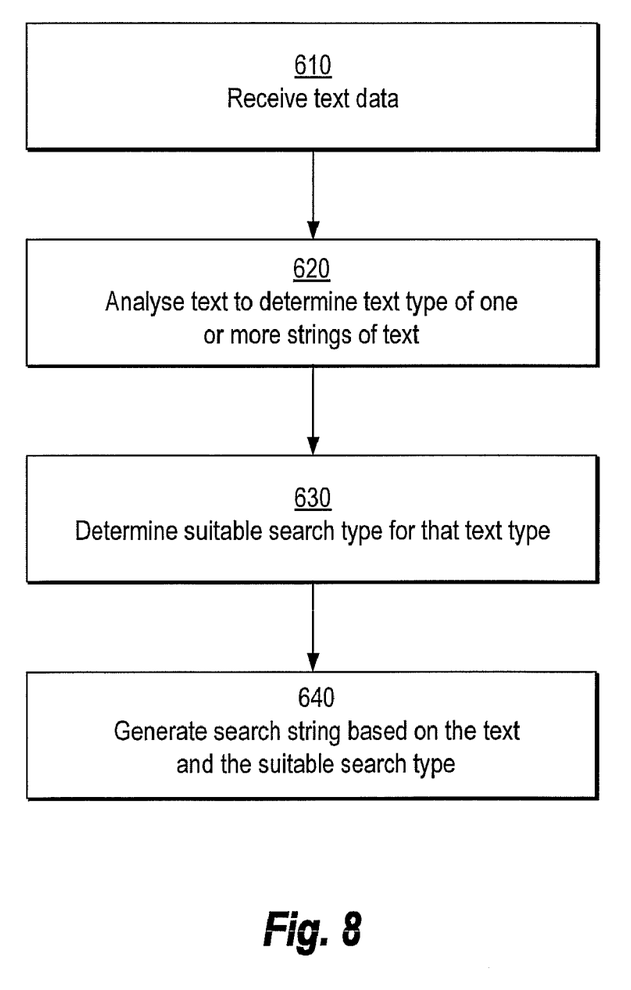
FIG. 8 is a flow diagram of a method of generating a relevant search string by finding suitable search types based on analysis of the text data.

FIG. 8 shows a method of determining an appropriate predefined search based on the text type determination. This may be used where there is no existing mapping of contextual data for the application in question (e.g. at 540 of FIG. 7). The method may also be used to generate a relevant search string based on input or extracted text when there is no contextual data (e.g. in a stand-alone method which does not use contextual data).

At 610 text data is received, e.g. by extracting text from a screen element or otherwise having text input into the search method. At 620 the text data is analyzed. Specifically the text data will comprise one or more strings of text and the type of these text strings is determined, for example by using regular expressions or similar methods such as those described above with reference to FIG. 6. At 630 a suitable search type is determined for that text type—this may be based on an existing mapping (defined in a file or in program code) of text types to search types. For example a text string which is a date may be entered to a 'by date' search type, while a text string which is an email address may be entered to a 'by email address' search type. At 640 a structured search string is generated based on the text string and its associated suitable search type. Where there are various text strings and associated suitable search types they may be logically combined to form more complicated searches using Boolean logic as described above in FIG. 3.

Figure 9:
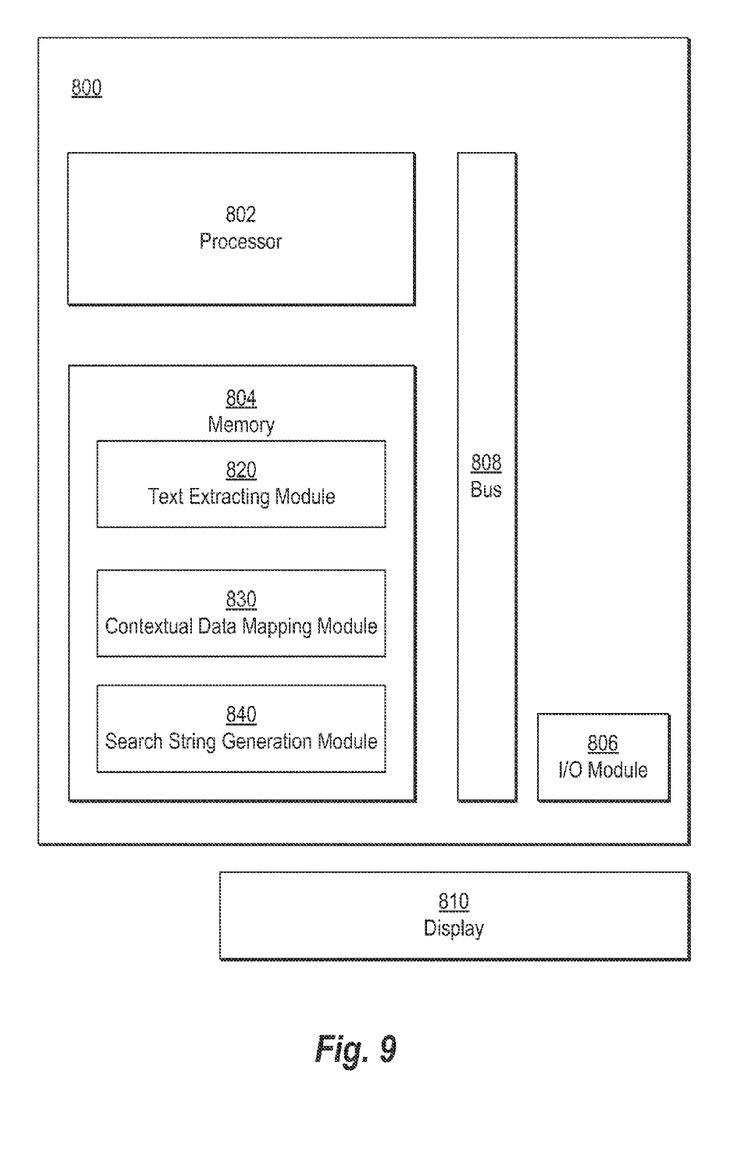
FIG. 9 is a simplified diagram of an apparatus for implementing the methods described in the present disclosure.

Referring now to FIG. 9 there is shown a block diagram of an apparatus 800 on which the present disclosure may be implemented. The apparatus comprises a processor 802 (e.g. CPU, microprocessor, ASIC, control logic, or micro controller etc) for executing machine readable instructions stored in a memory 804. The machine readable or computer executable instructions may, when executed by the processor 802, perform any or all of the method steps described above as a computer implemented method. Input and output operations may be handled by an I/O module 806. The processor 802, memory 804, and I/O module 806 are coupled or are in communication via a bus 808. Further, a display 810 is coupled to the I/O module 806. While the display 810 is shown as separate from the apparatus in this example, in other implementations it may be an integral part of the apparatus. The apparatus may be any apparatus which has a processor and a memory—in one example it is a desktop or notebook computer, in another example it is a mobile device, in yet another example it is a workstation and in a further example it is a printer.

In FIG. 9, the memory 804 is shown as storing modules of machine readable instructions which are executable by the processor—including a text extraction module 820 for performing the function of block 10 of FIG. 1, a contextual data mapping module 830 for performing the function of block 20 of FIG. 1 and a search string generation module 840 for performing the function of block 30 of FIG. 1. Such instructions may for instance be permanently stored in the memory or loaded into the memory from an external storage medium or received as a download over a network. Of course, the memory may store further modules or sub-modules for performing the processes and methods described in this disclosure and the accompanying diagrams.

In a further example a non-transitory machine-readable storage medium storing machine-readable instructions is provided that, when the instructions are executed by a processor, causes the processor to perform a method in accordance with any of the above-described examples.

It will be appreciated that examples can be realized in the form of hardware, software or a combination of hardware and software. Any such software may be stored in the form of tangible volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed implement examples of the present disclosure.

Accordingly, examples may provide a program comprising code for implementing a system or method as described herein and a machine readable storage storing such a program. Still further, examples may be conveyed electronically via any medium such as a communication signal carried over a wired or wireless connection and examples suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

What is claimed is:

1. A method performed by a computer, comprising:
extracting text and contextual information from a first screen element displayed by an application, the first screen element selected by a user action, and the first screen element being part of a plurality of screen elements that are displayed by the application, wherein the plurality of screen elements correspond to different contextual information and the contextual information extracted from the first screen element includes operating system data indicating a type of screen element from which the text is extracted;
obtaining a plurality of strings of different text data types from the extracted text via a series of analyses;
determining a plurality of search types for the plurality of strings based at least on the contextual information of the first screen element and the series of analyses, wherein the determined search types are selected from a plurality of different search types that are mapped to the different contextual information corresponding to the plurality of screen elements;
automatically appending the determined search types to respective strings from the plurality of strings;
automatically generating a relevant search string by logically combining the determined search types and the respective strings; and
searching a database with the relevant search string.

2. The method of claim 1, further comprising:
selecting the first screen element for extracting the text based on proximity of the first screen element to a user pointer.

3. The method of claim 1, wherein automatically generating the relevant search string further comprises:

converting at least one of the identified text strings into a predefined format before being appended to one of the determined search types.

4. The method of claim 1, further comprising:
extracting further text and further contextual information from a second screen element selected in response to a user action;
determining if the further contextual information is mapped to any of the plurality of different search types; and
in response to determining that the further contextual information is not mapped to any of the plurality of different search types, applying at least one of the plurality of different search types to a text string in the extracted further text based on at least one of: text analysis or user selection of search types.

5. The method of claim 4, further comprising:
storing the applied at least one of the plurality of different search types for future use with extracted text having the same or similar contextual information.

6. The method of claim 1, wherein the plurality of screen elements are part of respective different sections of a displayed application window corresponding to a record, the different sections containing different fields, wherein each respective contextual information of the different contextual information identifies a corresponding section of the different sections, and a mapping maps the different contextual data to respective different search types.

7. The method of claim 1, wherein the plurality of screen elements are part of respective different sections of a displayed email, the different sections containing different email fields, wherein each respective contextual information of the different contextual information identifies a corresponding section of the different sections, and a mapping maps the different contextual data to respective different search types.

8. The method of claim 1, further comprising:
storing a mapping that maps the different contextual information to respective different search types,
wherein the determining of the search type comprises accessing the mapping.

9. The method of claim 8, wherein the mapping maps the different contextual information to the different search types,
wherein the determining the plurality of search types for the extracted text comprises determining one or more of the plurality of the different search types, and
wherein automatically generating the relevant search string comprises generating the relevant search string comprising one or more of the plurality of different search types.

10. The method of claim 1, wherein the series of analyses comprises a water fall model that uses regular expressions to identify the text data types of the plurality of strings and to further map the plurality of text data types to at least the plurality of search types.

11. The method of claim 1, wherein the application is an email application.

12. A non-transitory computer readable storage medium storing machine executable instructions that upon execution by a processor cause a computer system to:
receive user interaction selecting a first screen element, the first screen element being part of a plurality of screen elements that are displayed by an application, wherein the plurality of screen elements correspond to different contextual information;
extract text and contextual information from the first screen element, wherein the contextual information extracted from the first screen element includes operating system data indicating a type of screen element from which the text is extracted;
identify a plurality of strings of different text data types from the extracted text using a series of analyses;
determine a plurality of search types for the extracted text based on the contextual information of the first screen element and the series of analyses, wherein the determined search types are selected from a plurality of different search types that are mapped to respective contextual information of the different contextual information corresponding to the plurality of screen elements;
automatically append the determined search types to respective strings from the plurality of strings;
automatically generate a relevant search string by logically combining the determined search types and the respective strings; and
search a database with the relevant search string.

13. The non-transitory computer readable storage medium of claim 12, wherein the plurality of screen elements are part of respective different sections of a displayed application window, the different sections containing different fields, wherein each respective contextual information of the different contextual information identifies a corresponding section of the different sections, and the non-transitory computer readable storage medium causes the computer system to generate a mapping that maps the different contextual data to respective ones of the plurality of different search types.

14. The non-transitory computer readable storage medium of claim 12, wherein the instructions upon execution cause the computer system to further:
store a mapping that maps the different contextual information to respective different search types,
wherein the determining of the search type comprises accessing the mapping and retrieving the search type that is correlated to the contextual information of the first screen element.

15. The non-transitory computer readable storage medium of claim 14, wherein the mapping maps the contextual information of the first screen element to one or more of the plurality of search types of the different search types, wherein the instructions for determining the plurality of search types for the extracted text comprise instructions that cause the computer system to:
determine one or more of the plurality of different search types, and
wherein automatically generating the relevant search string comprises generating the relevant search string comprising one or more of the plurality of different search types.

16. The non-transitory computer readable storage medium of claim 12, wherein machine executable instructions for extracting the contextual information from the first screen element cause the computer system to:
include within the contextual information extracted from the first screen element, a part of the first screen element that receives the user interaction.

17. An apparatus comprising:
a processor and a non-transitory computer readable storage medium comprising instructions executable by the processor to:
extract text and contextual data from a first screen element selected by a user action, the first screen element being part of a plurality of screen elements that are displayed by an application, wherein the plurality of screen elements correspond to different contextual information and the contextual data extracted from the first screen element including operating system data indicating a type of screen element from which the text is extracted;

obtain a plurality of strings of different text data types from the extracted text via a series of analyses;

determine a plurality of search types for the plurality of strings based at least on contextual information of the first screen element and the series of analyses, wherein the determined search types are selected from a plurality of different search types that are mapped to respective contextual information of the different contextual information corresponding to the plurality of screen elements;

automatically append the determined search types with respective strings from the plurality of strings;

automatically generate a relevant search string by combining the determined search types with the respective strings via Boolean logic; and search a database with the relevant search string.

18. The apparatus of claim 17, wherein the plurality of screen elements are part of respective different sections of a displayed application window, the different sections containing different fields, wherein each respective contextual information of the different contextual information identifies a corresponding section of the different sections, and a mapping maps the different contextual data to respective ones of the plurality of different search types.

19. The apparatus of claim 17, wherein the non-transitory computer readable storage medium comprising further instructions executable by the processor to:

determine if other contextual mapping data for the application associated with the first screen element is mapped to one or more of the plurality of different search types if no search types could be determined for the first screen element from the mappings of the plurality of different search types; and use the mapping associated with the other contextual data of the application if it is determined that mapping exists for the other contextual data.

20. The apparatus of claim 19, wherein the non-transitory computer readable storage medium comprising further instructions executable by the processor to:

determine the different text data types of the plurality of strings if it is determined that no mapping exists for the application; and select one of the plurality of search types mapped to the different text data types.

\* \* \* \* \*